MOUNT FOR ELECTRONIC TUBES

Filed April 12, 1965

INVENTOR.
PETER E. SLAVIN
BY Morse, Altman & Oates
ATTORNEYS

United States Patent Office 3,353,069

Patented Nov. 14, 1967

3,353,069

MOUNT FOR ELECTRONIC TUBES

Peter E. Slavin, Winchester, Mass., assignor to Intelligent Instruments, Inc., Winchester, Mass., a corporation of Massachusetts Filed Apr. 12, 1965, Ser. No. 447,279

5 Claims. (Cl. 317—101)

ABSTRACT OF THE DISCLOSURE

The mount for electronic tubes includes a chassis with a wall mounted on the chassis. A rigid sleeve open at both ends is mounted to the wall. The opposite ends of the sleeve extend from opposite sides of the wall. The sleeve is dimensioned to accommodate an electronic tube thereby providing a mounting for the tube instead of the conventional socket.

Figure 1:
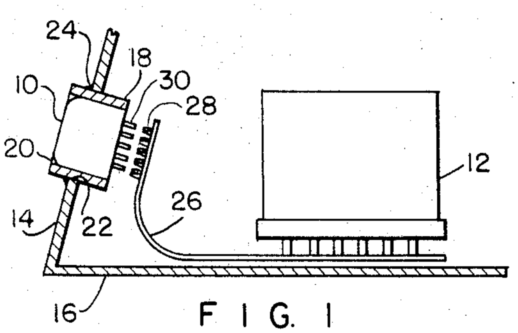

This invention relates generally to devices for mounting electronic tubes to chassis so that a portion of the tube is exposed and, more particularly, it is directed towards a simplified, low cost arrangement for mounting electronic tubes to chassis in a quick and easy fashion and in such a manner as to eliminate vibration of the tube and enhance the visibility of the exposed portion while providing greater protection for the tube.

In a great many electronic instruments, one or more tubes are mounted to the chassis so that a portion of the tube is flush with or projects to some extent through an opening in a wall of the chassis. For example, many instruments employ counting or "Nixie" tubes which provide a numerical display on the front face of the chassis so that an operator, in front of the chassis, may observe an indicated count registered on the tubes.

Most of the numerical indicator tubes now in use have the display at one end of the tube with pins at the opposite end for connection with a suitable socket located within the chassis. Heretofore, the mounting arrangement for such tubes included a circular opening formed in the front wall of the chassis and a bracket in position behind the opening in the chassis wall. Individual lead wires are then connected to the socket and the tube is pressed into place with the display end exposed through the opening.

The foregoing arrangement has several disadvantages. First of all, the bracket mounting for the socket subjects the tube to vibration. Also the tube itself is not too well protected and the display is not visible to the operator over a particularly wide angle of view. Because of the large number of wires usually associated with a tube of this sort, the possibility of error in wiring the tube is relatively high. Finally, the mounting arrangement is rather awkward, bulky and expensive to fabricate and assemble.

Accordingly, it is an object of the present invention to provide an improved mounting arrangement for electronic tubes.

A more particular object of this invention is to provide a novel means for mounting electronic tubes to chassis wherein a portion of the tube projects through the chassis wall.

A further object of this invention is to provide a simple, low cost mounting for tubes flush with or extending partly through an opening in a chassis wall.

A still further object of this invention is to provide a tube mounting arrangement of simple and low cost design and which protects the tube from damage and vibration.

More particularly, this invention features an arrangement for mounting electronic tubes to chassis, comprising a rigid sleeve having an inside diameter generally corresponding with the outside diameter of the tube and mounted to and extending through an opening in the chassis wall. The sleeve accommodates the tube which is inserted therein and may be fixed to the sleeve by a suitable resilient cement. A flexible printed circuit is employed to replace the usual bracket, socket and individual lead wires. The flexible printed circuit is formed with pin receiving members whereby the free end of the printed circuit may be pressed directly onto the pin end of the tube. The other end of the flexible printed circuit is connected to associated components within the chassis. The tube is thus mounted directly to the chassis wall and one portion of it extends through the wall opening without any other support except the rigid sleeve.

Figure 2:
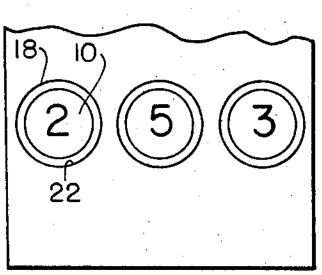
Figure 3:
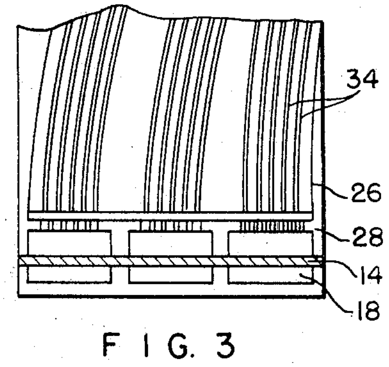
Figure 4:
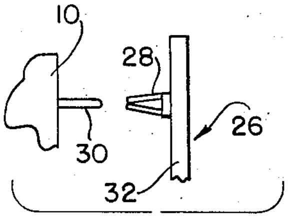
Figure 5:
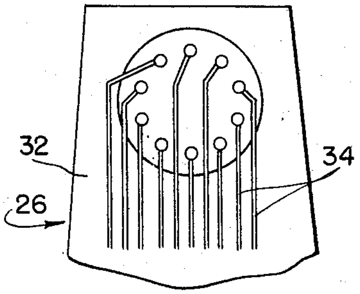
Figure 6:
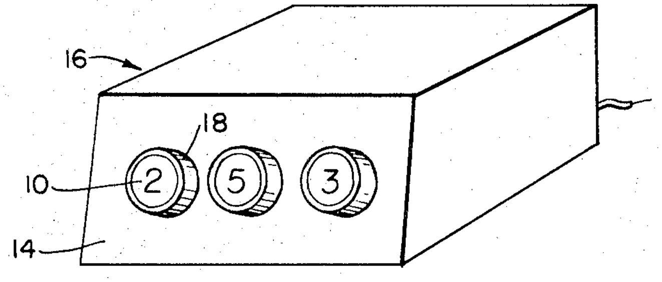

However, these and other features of the invention, along with further objects and advantages thereof, will become more fully apparent from the following detailed description of a preferred embodiment of the invention, with reference being made to the accompanying drawings in which:

FIG. 1 is a view in side elevation, partly in section, of a tube mounting arrangement made according to the invention, FIG. 2 is a view in front elevation thereof, FIG. 3 is a top plan view, partly in section, of the mounting arrangement, FIG. 4 is a detailed side view of the connection between the tube and the printed circuit, FIG. 5 is a fragmentary rear elevation showing a portion of the flexible printed circuit, and, FIG. 6 is a view in perspective of an electronic instrument having tubes mounted according to the invention.

Referring now to the drawings, the reference character 10 generally indicates an electronic tube such as a numerical indicator or "Nixie" tube comprising a glass envelope enclosing elements adapted to produce a variable numerical display, as suggested in FIG. 2, in response to signals from a driving circuit generally indicated at 12. The counting tube 10 is mounted to and through a front wall 14 of an electronic chassis housing 16, by means of a cylindrical sleeve 18, preferably fabricated from metal such as stainless steel or other suitable metal which may be plated with nickel or chrome.

The inside diameter of the sleeve is slightly greater than the outside diameter of the tube and the clearance between the tube and sleeve is sufficient to accommodate variations in the sizes from one tube to another. In any event, the gap between the tube and the sleeve is filled with a suitable sealant 20 such as a silicon adhesive, for example, which fixes the tube to the sleeve while at the same time providing a cushion between the tube and the sleeve.

The sleeve itself is press-fitted through a circular opening 22 in the front wall of the chassis and the sleeve preferably is fixed in position by a fillet of epoxy adhesive 24 or other suitable joining material. In practice the length of the sleeve generally corresponds with the length of the tube which it supports in order to provide as complete protection as possible to the tube. It will thus be understood that the tube requires no socket to mount it since the wall supported sleeve provides the mounting for the tube.

In place of the usual socket, bracket and multiple leads between the driving circuits and the tube, a flexible printed circuit 26 is provided with one end connected to the driving circuit 12 and the opposite end provided with a plurality of crimped terminals 28 for plug-in engagement with a plurality of pins 30 extending from the base of the tube. The terminal end of the printed circuit is merely pressed on to the tube pins once the tube has been mounted in the sleeve. This connection is easily made by merely pulling the end of the flexible printed circuit away from the tube base.

As best shown in FIGS. 1, 3, 4 and 5, the flexible printed circuit 26 comprises a belt-like stratum 32 of flexible dielectric material on which is printed circuit leads in the form of conductive strips 34 which are electrically connected at one end to the driving circuits and at the other end to the crimped terminals 28 which extend through the flexible stratum.

To mount a tube a circular hole is first formed in the front wall 14 of the chassis and the sleeve 18 is then press-fitted into the opening and cemented or otherwise secured in position. Next, the electronic tube 10 is inserted in the sleeve and the silicon adhesive 20 applied to hold the tube in position. Next, the plug end of the flexible printed circuit 26 is pressed onto the pins 30 to complete the assembly. The tube may be replaced by merely removing the adhesive 20 and withdrawing the tube from the sleeve.

It will be appreciated that the arrangement provides a marked savings in space since there is no socket and no supporting metal structure as previously required. Furthermore, one-third to one-half of the tube body may now be mounted outside the chassis and the display of the tube may be read from a much wider angle. Aesthetically the arrangement enhances the appearance of the instrument. Furthermore, the tube itself may be slightly rotated to insure that the numbers on the tube are exactly vertical.

A further advantage of this type of mounting is that the cost is less than other tube mountings insofar as the assembly operations may be carried out faster than when making conventional mountings. The use of printed circuits eliminates any errors which may occur in wiring.

One of the more significant advantages made available by the mounting is that the tube itself is much better protected since there is no cantilever effects which usually are present where bracket mounted sockets are used to support the tube. Furthermore, substantially all of the glass envelope is covered by the protective metal sleeve.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

1. A mount for electronic tubes comprising, (a) a chassis,
(b) a wall mounted to said chassis,
(c) said wall being formed with an opening therethrough, and,
(d) a rigid sleeve open at both ends mounted to said wall through said opening with opposite ends of said sleeve extending from opposite sides of said wall,
(e) said sleeve being dimensioned to accommodate an electronic tube inserted axially therein whereby one end of said tube will be exposed at one side of said wall and the other end at the opposite side thereof.

2. A mount according to claim 1 in combination with a tube mounted within said sleeve, and a flexible printed circuit mounted within said chassis and having a portion thereof connected to the other end of said tube.

3. A mount for electronic tubes, comprising in combination (a) walls defining a chassis,
(b) at least one of said walls being formed with at least one opening therethrough,
(c) a rigid sleeve open at both ends mounted to said one wall and extending through said opening.
(d) said sleeve being dimensioned to accommodate an electronic tube inserted axially therein whereby one end of said tube will be exposed,
(e) a tube mounted in said sleeve, and,
(f) a flexible printed circuit mounted within said chassis and having one portion thereof electrically connected with the other end of said tube.

4. A mount according to claim 3 including terminal members mounted on said one portion of said flexible printed circuit.

5. A mount according to claim 3 including a resilient stratum disposed about the inner surface of said sleeve for cushioning said tube and holding said tube in place.

References Cited

UNITED STATES PATENTS 3,189,863 6/1965 Leach ---------------- 339—17

FOREIGN PATENTS 1,042,955 6/1953 France.

ROBERT K. SCHAEFER, *Primary Examiner.*

W. C. GARVERT, J. R. SCOTT, *Assistant Examiners.*